(12) United States Patent
Matsumoto et al.

(10) Patent No.: US 11,408,367 B2
(45) Date of Patent: Aug. 9, 2022

(54) INTERNAL COMBUSTION ENGINE

(71) Applicant: Honda Motor Co., Ltd., Tokyo (JP)

(72) Inventors: Shogo Matsumoto, Saitama (JP);
Nobuyuki Akaishi, Saitama (JP);
Suguru Fukuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/952,101

(22) Filed: Nov. 19, 2020

(65) Prior Publication Data

US 2021/0156336 A1    May 27, 2021

(30) Foreign Application Priority Data

Nov. 21, 2019 (JP) .............................. JP2019-210560

(51) Int. Cl.
*F02F 3/26* (2006.01)
*F02B 23/10* (2006.01)
*F02F 1/24* (2006.01)

(52) U.S. Cl.
CPC .............. *F02F 3/26* (2013.01); *F02B 23/104* (2013.01); *F02F 1/242* (2013.01); *F02B 2023/106* (2013.01)

(58) Field of Classification Search
CPC . F02F 1/242; F02F 3/26; F02B 23/104; F02B 2023/106
See application file for complete search history.

(56) References Cited

U.S. PATENT DOCUMENTS 6,725,828 B1 *   4/2004   Han ..................... F02B 23/101
                                                              123/295
2010/0059016 A1   3/2010   Tachibana et al.

FOREIGN PATENT DOCUMENTS

| CN | 1590729   | 3/2005  |
| CN | 1745232   | 3/2006  |
| CN | 105863817 | 8/2016  |
| CN | 106014667 | 10/2016 |
| CN | 110462178 | 11/2019 |

(Continued)

OTHER PUBLICATIONS

Nov. 18, 2019, Worktruck, "Understanding Direct and Port Injection in Engines," https://www.worktruckonline.com/344681/digging-deeper-direct-or-port-injection-in-engies (Year: 2019).*

(Continued)

*Primary Examiner* — Kevin A Lathers
(74) *Attorney, Agent, or Firm* — JCIPRNET

(57) ABSTRACT

An internal combustion engine includes: a piston guided by a cylinder to reciprocate along a cylinder axis and forming a combustion chamber with a crown surface facing a cylinder head; and a fuel injection valve having an injection port facing the combustion chamber and injecting fuel to a forward tumble flow in the combustion chamber. A ridge formed on the crown surface rises toward a ceiling surface side relative to a reference plane, orthogonal to the cylinder axis and including an outer peripheral edge of the crown surface, and has a ridge line formed by a curved surface to surround a recessed part. The recessed part is recessed toward a center of the crown surface in a direction orthogonal to a virtual plane including the cylinder axis and parallel to a rotation axis of a crankshaft, and is recessed toward the center in an axial direction of the crankshaft.

4 Claims, 4 Drawing Sheets

(56) References Cited

FOREIGN PATENT DOCUMENTS

| | | | |
|---|---|---|---|
| JP | H0972221 | 3/1997 | |
| JP | 2008184930 | 8/2008 | |
| JP | 2008184930 A * | 8/2008 | ............ F02B 31/085 |
| JP | 2011214557 | 10/2011 | |
| JP | 2016113990 | 6/2016 | |
| JP | 2018087506 | 6/2018 | |
| JP | 2018162730 | 10/2018 | |

OTHER PUBLICATIONS

Office Action of China Counterpart Application, with English translation thereof, dated Jan. 27, 2022, pp. 1-14.
Office Action of Japan Counterpart Application, with English translation thereof, dated Feb. 2, 2022, pp. 1-8.
"Office Action of China Counterpart Application" with English translation thereof, dated May 10, 2022, p. 1-p. 14.

* cited by examiner

INTERNAL COMBUSTION ENGINE

CROSS-REFERENCE TO RELATED APPLICATION

This application claims the priority benefits of Japanese application no. 2019-210560, filed on Nov. 21, 2019. The entirety of the above-mentioned patent application is hereby incorporated by reference herein and made a part of this specification.

BACKGROUND

Technical Field

The disclosure relates to an internal combustion engine including a piston and a fuel injection valve. The piston is guided by a cylinder to reciprocate freely along a cylinder axis and forms a combustion chamber with a crown surface facing a cylinder head. The fuel injection valve has an injection port facing the combustion chamber and injects fuel into a forward tumble flow formed in the combustion chamber.

Description of Related Art

Patent Document 1 discloses an in-cylinder injection type spark ignition internal combustion engine (so-called direct injection internal combustion engine). The internal combustion engine includes a piston that is guided by a cylinder to reciprocate freely along a cylinder axis and forms a combustion chamber with a crown surface facing a cylinder head. A recessed part having an elliptical contour with a long axis in the axial direction of a crankshaft is formed on the crown surface of the piston. The recessed part can delay the collapse of the forward tumble flow generated in the combustion chamber. As a result, it is possible to suppress a decrease in the ignitability of the air-fuel mixture even when a high compression ratio operation is performed.

RELATED ART

Patent Document
[Patent Document 1] Japanese Laid-Open No. 2016-113990

Problems to be Solved

In an internal combustion engine that assumes high compression ratio operation, there is a limit to the volume of the recessed part that can be formed on the crown surface of the piston. The formation of the recessed part causes an increase in the volume of the combustion chamber. As the volume of the combustion chamber increases, the compression ratio of the internal combustion engine decreases. A decrease in the compression ratio leads to a decrease in thermal efficiency. If the compression ratio is increased, the thermal efficiency can be increased. Due to the volume limit resulting from the high compression ratio, the flexibility in designing the crown surface shape of the piston is greatly limited.

SUMMARY

According to an embodiment of the disclosure, an internal combustion engine includes: a piston that is guided by a cylinder to reciprocate freely along a cylinder axis and forms a combustion chamber with a crown surface facing a cylinder head; and a fuel injection valve that has an injection port facing the combustion chamber and injects fuel to a forward tumble flow formed in the combustion chamber. A ridge is formed on the crown surface, and the ridge rises toward a ceiling surface side of the combustion chamber with respect to a reference plane, which is orthogonal to the cylinder axis and includes an outer peripheral edge of the crown surface, and has a ridge line formed by a curved surface to surround a recessed part without interruption. The recessed part is recessed toward a center of the crown surface in a direction orthogonal to a virtual plane that includes the cylinder axis and is parallel to a rotation axis of a crankshaft, and is recessed toward the center of the crown surface in an axial direction of the crankshaft.

DESCRIPTION OF THE EMBODIMENTS

Figure 1:
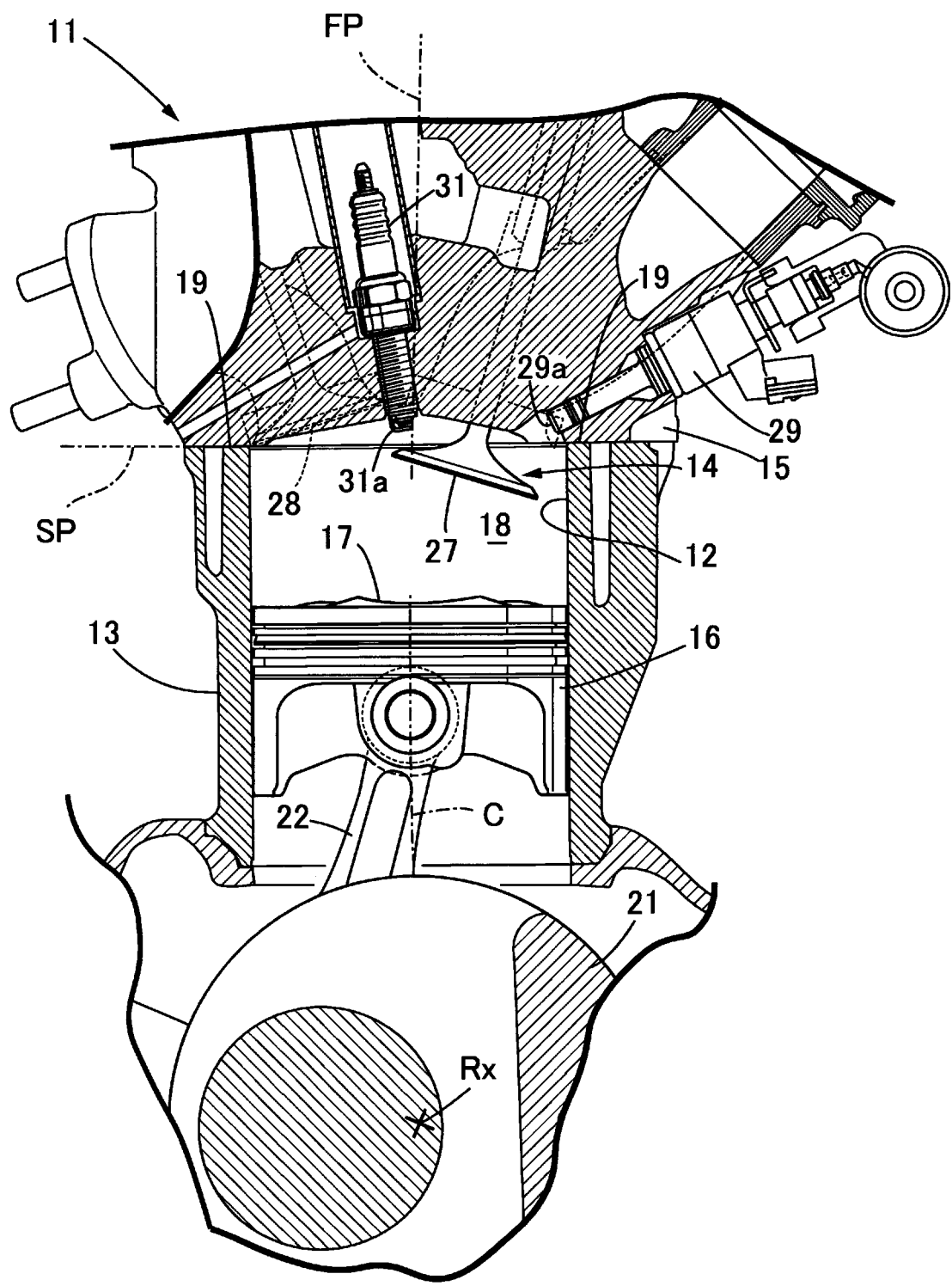
FIG. 1 is a partial cross-sectional view schematically showing the structure of an internal combustion engine according to an embodiment of the disclosure, which is observed on a cross section of a virtual plane that includes a cylinder axis and is orthogonal to a rotation axis of a crankshaft.

In view of the above circumstances, the disclosure provides an internal combustion engine that can contribute to an improvement of the compression ratio based on a reduction in the volume of the combustion chamber while strengthening the forward tumble flow.

Means for Solving the Problems

According to an embodiment of the disclosure, an internal combustion engine includes: a piston that is guided by a cylinder to reciprocate freely along a cylinder axis and forms a combustion chamber with a crown surface facing a cylinder head; and a fuel injection valve that has an injection port facing the combustion chamber and injects fuel to a forward tumble flow formed in the combustion chamber. A ridge is formed on the crown surface, and the ridge rises toward a ceiling surface side of the combustion chamber with respect to a reference plane, which is orthogonal to the cylinder axis and includes an outer peripheral edge of the crown surface, and has a ridge line formed by a curved surface to surround a recessed part without interruption. The recessed part is recessed toward a center of the crown surface in a direction orthogonal to a virtual plane that includes the cylinder axis and is parallel to a rotation axis of a crankshaft, and is recessed toward the center of the crown surface in an axial direction of the crankshaft.

According to an embodiment, in addition to the above configuration, the internal combustion engine includes a recess that is formed on the crown surface while being separated from the recessed part by a part of the ridge, and partitions a space for receiving each of an intake valve and an exhaust valve near a top dead center of the piston.

According to an embodiment, in addition to the above configuration, the ridge includes a pair of first ridges extending in parallel in the axial direction of the crankshaft, and a pair of second ridges extending in parallel in the direction orthogonal to the virtual plane and connecting ends of the first ridges to each other. The second ridge increases a raised amount from the reference plane as the second ridge approaches the first ridge.

According to an embodiment, in addition to the above configuration, the internal combustion engine further includes a spark plug that has an electrode facing the combustion chamber at a position offset toward an exhaust valve side with respect to the virtual plane. The recessed part has a deepest part in the virtual plane, and a curvature radius on the exhaust valve side from the deepest part is greater than a curvature radius on an intake valve side from the deepest part.

Effects

According to an embodiment, the airflow flowing in from the intake port is guided by the recessed surface that deepens toward the center of the crown surface in the direction orthogonal to the virtual plane, and is guided by the recessed surface that deepens toward the center of the crown surface in the axial direction of the crankshaft. The forward tumble flow can be strengthened because the tumble flow is kept close to the compression top dead center by the guidance of the recessed surface. The collapse of the tumble flow is delayed. Since the sprayed fuel is caught in the tumble flow, the diffusion of the sprayed fuel toward the crown surface of the piston can be suppressed. The adhesion of the sprayed fuel to the combustion chamber can be suppressed. Since the tumble flow is maintained as long as possible, the thermal efficiency is improved. Moreover, since the ridge line of the ridge is formed by the curved surface, the volume of the combustion chamber can be reduced at the top dead center of the piston as compared with a case of a linear ridge line that has the same ridge height. The reduction in the volume of the combustion chamber can contribute to an improvement of the thermal efficiency.

According to an embodiment, since the recesses are separated from the recessed part, good flow regulating effect of the recessed part can be maintained as compared with a case where the recesses are continuous with the recessed part. Such recesses can contribute to an improvement of the thermal efficiency. Further, it is possible to reduce the volume of the combustion chamber while suppressing the interference of the intake valve and the exhaust valve.

According to an embodiment, the raised amount can be ensured at the end of the first ridge, and as a result, the recesses can be well separated from the recessed part. Since the second ridge is recessed toward the center, the formation of the tumble flow can be strengthened. In addition, the tumble flow can be maintained.

According to an embodiment, even if the electrode of the spark plug is offset toward the exhaust valve side, the tumble flow is concentrated on the electrode of the spark plug, so good ignition can be realized in the combustion chamber.

Hereinafter, embodiments of the disclosure will be described with reference to the accompanying drawings.

FIG. 1 is a conceptual diagram schematically showing an internal combustion engine according to an embodiment of the disclosure. The internal combustion engine 11 includes a cylinder block 13 that has a cylinder bore (cylinder) 12 for partitioning a cylindrical space coaxial with a cylinder axis C, and a cylinder head 15 that is coupled to the upper end of the cylinder block 13 and supports a valve operating mechanism 14. The cylinder block 13 accommodates a piston 16 that is guided by the cylinder bore 12 to reciprocate freely along the cylinder axis C. The piston 16 forms a combustion chamber 18 with the cylinder head 15 with a crown surface 17 facing the cylinder head 15. The opening of the cylinder bore 12 is surrounded by a seat surface 19 that receives the cylinder head 15. The seat surface 19 extends in a plane orthogonal to the cylinder axis C. The internal combustion engine 11 is configured in an in-cylinder injection type internal combustion engine (so-called direct injection internal combustion engine) as described later.

A crankshaft 21 that is rotatably supported in a crankcase around a rotation axis Rx is connected to the piston 16. A connecting rod 22 connects the piston 16 and the crank pin of the crankshaft 21. The linear motion of the piston 16 is converted into the rotational motion of the crankshaft 21 by the action of the connecting rod 22.

Figure 2:
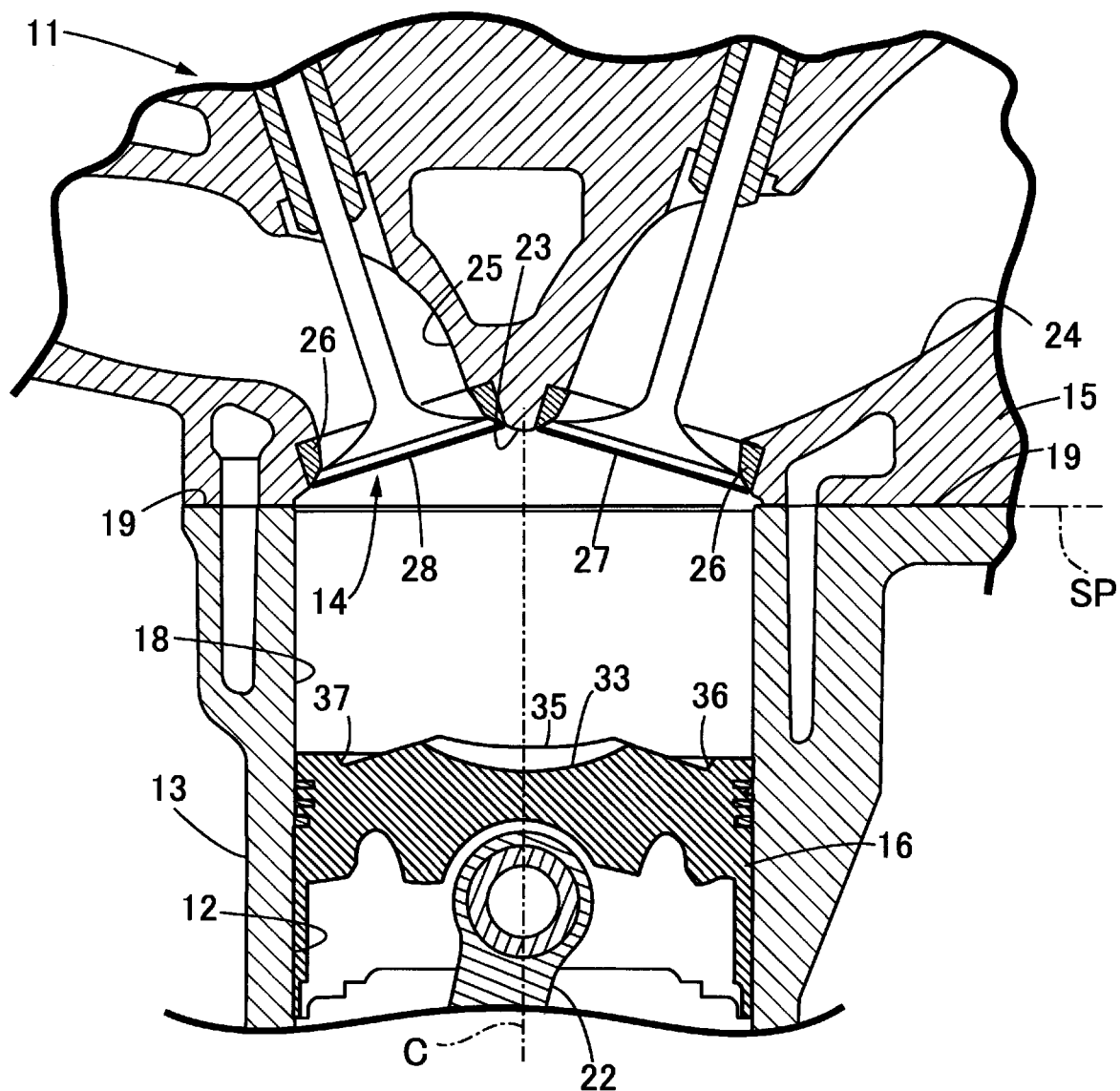
FIG. 2 is a partial cross-sectional view schematically showing the structure of a cross section that includes the axial centers of an intake valve and an exhaust valve.

As shown in FIG. 2, the cylinder head 15 is formed with two intake ports 24 that open side by side on a ceiling surface 23, and two exhaust ports 25 that open side by side on the ceiling surface 23. The intake port 24 is formed in a shape that creates a forward tumble flow in the combustion chamber 18. Valve seats 26 are fixed to the opening of the intake port 24 and the opening of the exhaust port 25 respectively.

The valve operating mechanism 14 includes an intake valve 27 that is supported by the cylinder head 15 to be displaceable in the axial direction and faces the combustion chamber 18 to open and close the opening of the intake port 24, and an exhaust valve 28 that is supported by the cylinder head 15 to be displaceable in the axial direction and faces the combustion chamber 18 to open and close the opening of the exhaust port 25. The intake valve 27 and the exhaust valve 28 are respectively seated on the valve seats 26 when the intake port 24 and the exhaust port 25 are closed.

The valve operating mechanism 14 causes the intake valve 27 and the exhaust valve 28 to displace in the axial direction by the action of a camshaft (not shown) that is supported by the cylinder head 15 to be rotatable around an axial center parallel to the rotation axis Rx of the crankshaft 21. A rocker arm (not shown) can be interposed between the intake valve 27 and the exhaust valve 28 and the camshaft when the intake valve 27 and the exhaust valve 28 are displaced in the axial direction.

As shown in FIG. 1, a fuel injection valve 29 and a spark plug 31 are supported by the cylinder head 15. The fuel injection valve 29 has an injection port 29a facing the combustion chamber 18 and injects fuel into the forward tumble flow formed in the combustion chamber 18. The spark plug 31 has an electrode 31a facing the combustion chamber 18 at a position offset toward the side of the exhaust valve 28 with respect to the virtual plane FP that includes the cylinder axis C and is parallel to the rotation axis Rx of the crankshaft 21. Here, the injection port 29a of the fuel injection valve 29 is arranged on the ceiling surface 23 in a region that is sandwiched between the virtual plane SP and the openings of the two intake ports 24, and the virtual plane SP is orthogonal to the cylinder axis C and includes the plane where the cylinder block 13 and the cylinder head 15 are combined. The fuel injection valve 29 sprays fuel into the forward tumble flow in the combustion chamber 18 to generate an air-fuel mixture. The position of the injection port 29a is aligned with the virtual plane TP that includes the cylinder axis C and is orthogonal to the rotation axis Rx of the crankshaft 21. The electrode 31a of the spark plug 31 is arranged on the ceiling surface 23 in a region surrounded by the openings of the intake ports 24 and the openings of the exhaust ports 25. Combustion is realized in the combustion chamber 18 when the spark plug 31 ignites the air-fuel mixture. The position of the electrode 31a is aligned with the virtual plane TP that includes the cylinder axis C and is orthogonal to the rotation axis Rx of the crankshaft 21.

Figure 3:
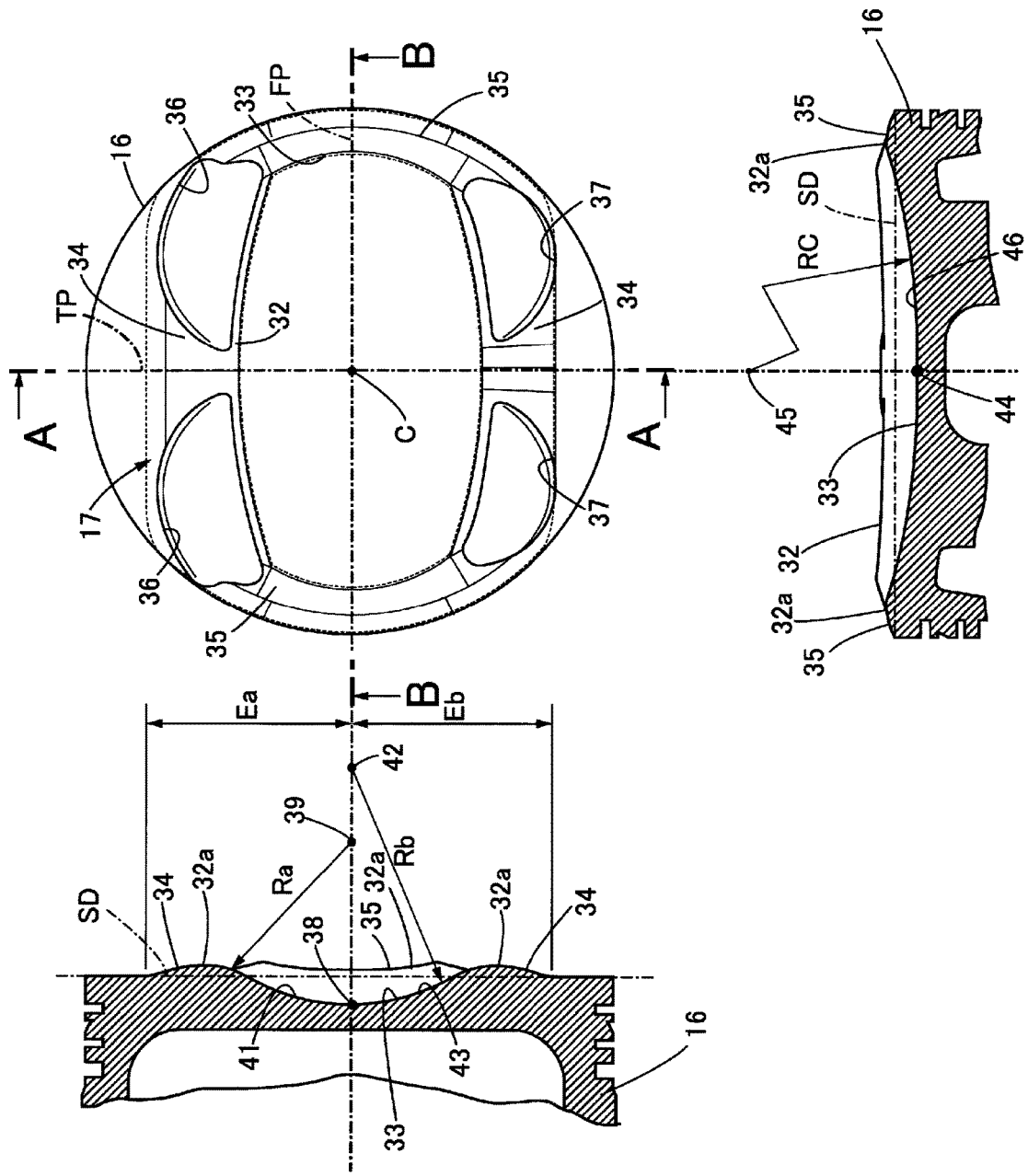
FIG. 3 is a view schematically showing the structure of a crown surface of a piston.

As shown in FIG. 3, a ridge 32 is formed on the crown surface 17 of the piston 16. The ridge 32 rises toward the ceiling surface side of the combustion chamber with respect to the reference plane (compression height) SD, which is orthogonal to the cylinder axis C and includes the outer peripheral edge of the crown surface 17, and has a ridge line 32a formed by a curved surface to surround a recessed part 33 without interruption. The ridge 32 includes a pair of first ridges 34 extending in parallel in the axial direction of the crankshaft 21, and a pair of second ridges 35 extending in parallel in the direction orthogonal to the virtual plane FP and connecting the ends of the first ridges 34 to each other. The second ridge 35 increases the raised amount from the reference plane SD as it approaches the first ridge 34. That is, the ridge line 32a of the second ridge 35 is curved to be in contact with a cylindrical surface of a specific curvature radius. Since the second ridges 35 extend along the outer peripheral edge of the crown surface 17, the recessed part 33 is partitioned into a band shape extending in the axial direction of the crankshaft 21 in the top view of the crown surface 17.

The crown surface 17 is formed with intake valve recesses 36 which are separated from the recessed part 33 by a part of the ridge 32, and exhaust valve recesses 37 which are separated from the recessed part 33 by a part of the ridge 32. The intake valve recess 36 individually partitions a space for receiving the intake valve 27 near the top dead center of the piston 16. The exhaust valve recess 37 individually partitions a space for receiving the exhaust valve 28 near the top dead center of the piston 16. Interference between the piston 16 and the intake valve 27 and the exhaust valve 28 is avoided near the top dead center of the piston 16.

The recessed part 33 is deeply recessed toward the center of the crown surface 17 in the direction orthogonal to the virtual plane FP that includes the cylinder axis C and is parallel to the rotation axis Rx of the crankshaft 21, and is deeply recessed toward the center of the crown surface 17 in the axial direction of the crankshaft 21. The recessed part 33 has a deepest part 38 in the virtual plane FP in the direction orthogonal to the virtual plane FP. The recessed part 33 has a first curved surface 41 having a center of curvature 39 in the virtual plane FP and extending toward the side of the intake valve 27, and a second curved surface 43 having a center of curvature 42 in the virtual plane FP and extending toward the side of the exhaust valve 28 in a plane orthogonal to the rotation axis Rx of the crankshaft 21. The curvature radius Rb of the second curved surface 43 is greater than the curvature radius Ra of the first curved surface 41. As a result, the spread of the recessed part 33 is offset toward the side of the exhaust valve 28 with respect to the virtual plane FP. Therefore, the parameter Ea indicating the spread of the recessed part 33 on the side of the intake valve 27 is smaller than the parameter Eb indicating the spread of the recessed part 33 on the side of the exhaust valve 28. Here, in the plane orthogonal to the rotation axis Rx of the crankshaft 21, the ridge 32 has the same shape on the side of the intake valve 27 and the side of the exhaust valve 28.

The recessed part 33 has a deepest part 44 in the virtual plane TP in the axial direction of the crankshaft 21. The recessed part 33 has a curved surface 46 having a center of curvature 45 in the virtual plane TP and extending in a uniform curvature radius Re in the virtual plane FP and a plane parallel thereto.

Figure 4:
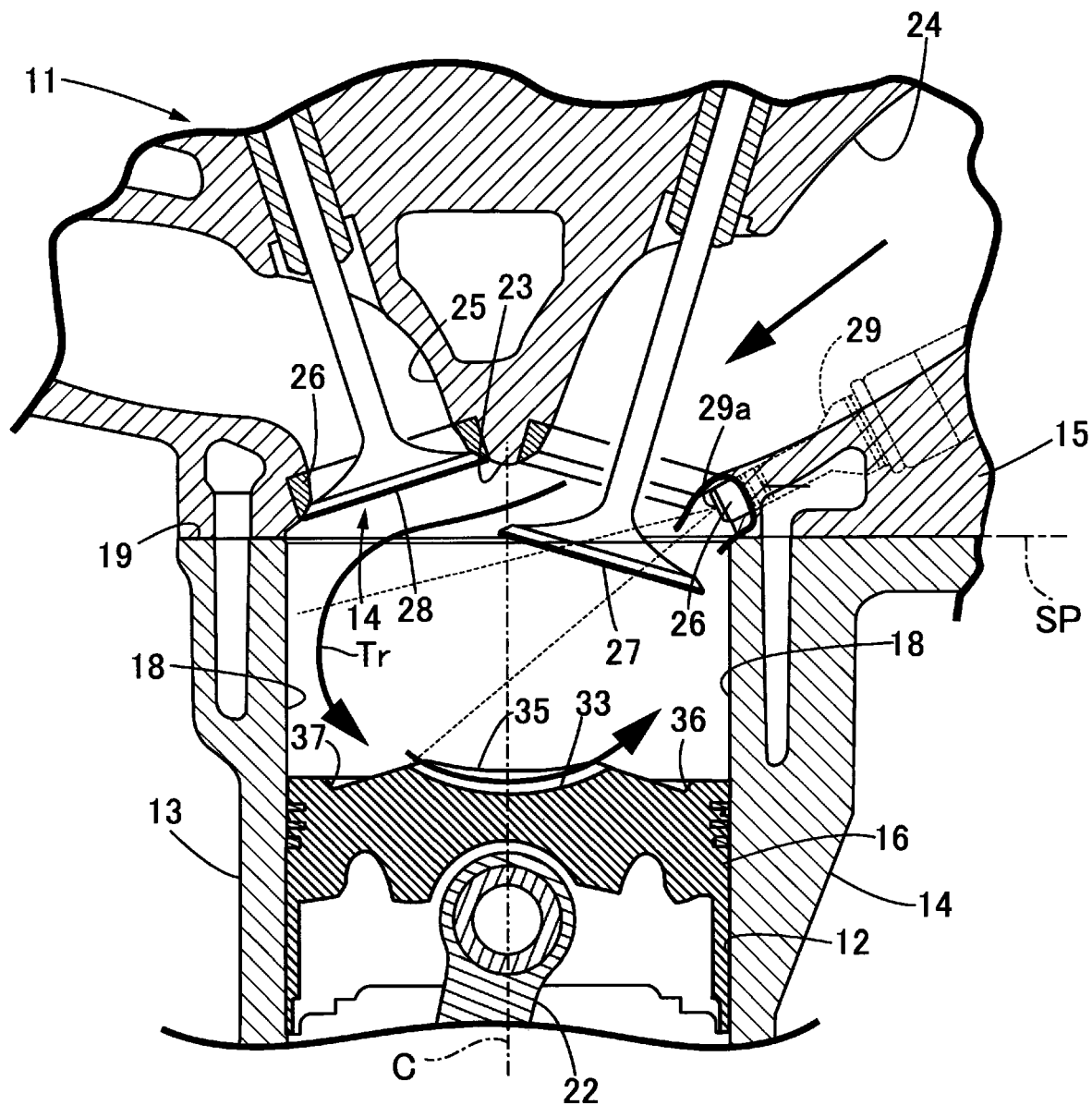
FIG. 4 is a partial cross-sectional view of the internal combustion engine schematically showing a forward tumble flow formed in a combustion chamber.

Next, the operation of the internal combustion engine 11 according to the present embodiment will be described. As shown in FIG. 4, in the intake stroke of the internal combustion engine 11, the piston 16 descends from the top dead center to the bottom dead center. The intake valve 27 is separated from the valve seat 26 by the action of the camshaft. The intake port 24 is connected to the combustion chamber 18. Air is introduced into the combustion chamber 18 from the intake port 24 as the piston 16 descends. A forward tumble flow Tr is formed in the combustion chamber 18. The airflow flowing in from the intake port 24 is guided by the recessed surface that deepens toward the center of the crown surface 17 in the direction orthogonal to the virtual plane FP, and is guided by the recessed surface that deepens toward the center of the crown surface 17 in the axial direction of the crankshaft 21. In this way, the forward tumble flow Tr is strengthened. The collapse of the forward tumble flow Tr is delayed.

The fuel injection valve 29 sprays fuel into the combustion chamber 18. Since the sprayed fuel is caught in the forward tumble flow Tr, the diffusion of the sprayed fuel toward the crown surface 17 of the piston 16 can be suppressed. The adhesion of the sprayed fuel to the inside of the combustion chamber 18 can be suppressed. Further, by aiming the sprayed fuel at the center of the forward tumble flow where the flow is weak, the fuel can stay at the center of the forward tumble flow, which further suppresses the adhesion of the sprayed fuel to the inside of the combustion chamber 18.

In the compression stroke, the piston 16 ascends from the bottom dead center to the top dead center. The forward tumble flow Tr is maintained as long as possible while contracting as the piston 16 ascends. When the piston 16 starts to descend, the spark plug 31 ignites the air-fuel mixture. The air-fuel mixture burns in the combustion chamber 18. The combustion chamber 18 expands. Since the forward tumble flow Tr is maintained as long as possible, the forward tumble flow Tr flowing into the combustion chamber 18 from the intake port 24 collapses near the compression top dead center and is converted into turbulent kinetic energy. In this way, homogeneous combustion is promoted and the thermal efficiency is improved.

Moreover, since the ridge line 32a of the ridge 32 is formed by a curved surface, the volume of the combustion chamber can be reduced at the top dead center of the piston 16 as compared with a case of a linear ridge line that has the same ridge height. Therefore, it is possible to reduce the volume of the combustion chamber while suppressing the interference of the intake valve 27 and the exhaust valve 28 with the crown surface 17 as much as possible. The reduction in the volume of the combustion chamber can contribute to an improvement of the compression ratio.

In the present embodiment, the intake valve recess 36 and the exhaust valve recess 37 on the crown surface 17 are separated from the recessed part 33 by a part of the ridge 32. Good flow regulating effect of the recessed part 33 can be maintained as compared with a case where the recesses are continuous with the recessed part 33. Such intake valve recess 36 and exhaust valve recess 37 can contribute to an improvement of the thermal efficiency.

In the piston 16 according to the present embodiment, the second ridge 35 increases the raised amount from the reference plane SD as it approaches the first ridge 34. The raised amount can be ensured at the end of the first ridge 34, and as a result, the intake valve recess 36 and the exhaust valve recess 37 can be well separated from the recessed part 33. Since the second ridge 35 is recessed toward the center, the formation of the forward tumble flow Tr can be strengthened.

In the internal combustion engine 11 according to the present embodiment, the curvature radius Rb on the side of the exhaust valve 28 from the deepest part 38 of the recessed part 33 is greater than the curvature radius Rb on the side of the intake valve 27 from the deepest part 38. Therefore, even if the electrode 31a of the spark plug 31 is offset toward the side of the exhaust valve 28, the forward tumble flow Tr is concentrated on the electrode 31a of the spark plug 31, so good ignition can be realized in the combustion chamber 18.

What is claimed is:

1. An internal combustion engine, comprising:
    a piston, configured to be guided by a cylinder to reciprocate freely along a cylinder axis and form a combustion chamber with a crown surface facing a cylinder head; and
    a fuel injection valve, having an injection port facing the combustion chamber and configured to inject fuel to a forward tumble flow formed in the combustion chamber,
    wherein a ridge is formed on the crown surface, and the ridge rises toward a ceiling surface side of the combustion chamber with respect to a reference plane, which is orthogonal to the cylinder axis and comprises an outer peripheral edge of the crown surface, and has a ridge line formed by a curved surface to surround a recessed part without interruption, and
    the recessed part is recessed toward a center of the crown surface in a direction along the cylinder axis and extends toward the outer peripheral edge of the crown surface,
    the recessed part has a first deepest part in a first virtual plane that comprises the cylinder axis and is parallel to a rotation axis of a crankshaft, and a second deepest part in a second virtual plane that comprises the cylinder axis and is orthogonal to the rotation axis of the crankshaft,
    wherein the first deepest part and the second deepest part are located at the center of the crown surface,
    wherein the internal combustion engine further comprises:
    a spark plug, having an electrode facing the combustion chamber at a position offset toward an exhaust valve side with respect to the first virtual plane;
    wherein a curvature radius on the exhaust valve side from the first deepest part is greater than a curvature radius on an intake valve side from the first deepest part.

2. The internal combustion engine according to claim 1, comprising a recess that is formed on the crown surface while being separated from the recessed part by a part of the ridge, and partitions a space for receiving each of an intake valve and an exhaust valve near a top dead center of the piston.

3. The internal combustion engine according to claim 2, wherein the ridge comprises a pair of first ridges extending in parallel in the axial direction of the crankshaft, and a pair of second ridges aligned and extending in the direction orthogonal to the first virtual plane and connecting ends of the first ridges to each other, wherein the second ridge increases a raised amount from the reference plane as the second ridge approaches the first ridge.

4. An internal combustion engine, comprising:
    a piston, configured to be guided by a cylinder to reciprocate freely along a cylinder axis and form a combustion chamber with a crown surface facing a cylinder head; and
    a fuel injection valve, having an injection port facing the combustion chamber and configured to inject fuel to a forward tumble flow formed in the combustion chamber,
    wherein a ridge is formed on the crown surface, and the ridge rises toward a ceiling surface side of the combustion chamber with respect to a reference plane, which is orthogonal to the cylinder axis and comprises an outer peripheral edge of the crown surface, and has a ridge line formed by a curved surface to surround a recessed part without interruption,
    wherein the recessed part is recessed toward a center of the crown surface in a direction along the cylinder axis and extends toward the outer peripheral edge of the crown surface,
    wherein the recessed part has a first deepest part in a first virtual plane that comprises the cylinder axis and is parallel to a rotation axis of a crankshaft, and a second deepest part in a second virtual plane that comprises the cylinder axis and is orthogonal to the rotation axis of the crankshaft,
    wherein the first deepest part and the second deepest part are located at the center of the crown surface, and
    wherein a distance between the ridge and a ceiling surface of the combustion chamber is smaller than a distance between the outer peripheral edge of the crown surface and the ceiling surface of the combustion chamber.

* * * * *